United States Patent
Furuya

(10) Patent No.: US 7,567,308 B2
(45) Date of Patent: Jul. 28, 2009

(54) REFLECTIVE ACTIVE MATRIX LIQUID CRYSTAL DISPLAY AND APPARATUS

(75) Inventor: Masato Furuya, Yokosuka (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 323 days.

(21) Appl. No.: 11/287,561

(22) Filed: Nov. 23, 2005

(65) Prior Publication Data

US 2006/0113540 A1    Jun. 1, 2006

(30) Foreign Application Priority Data

Nov. 30, 2004    (JP) .............................. 2004-347721

(51) Int. Cl.
*G02F 1/136* (2006.01)
(52) U.S. Cl. ..................... 349/43; 349/38; 349/113; 349/143; 349/144; 349/147; 349/111
(58) Field of Classification Search ................. 349/113, 349/43, 143, 144, 147, 111, 38
See application file for complete search history.

(56) References Cited

U.S. PATENT DOCUMENTS

| | | | | |
|---|---|---|---|---|
| 5,990,988 | A * | 11/1999 | Hanihara et al. ............ | 349/48 |
| 6,023,309 | A | 2/2000 | Gogna et al. ................ | 349/42 |
| 6,049,132 | A * | 4/2000 | Iwahashi et al. ............. | 257/763 |
| 6,628,358 | B1 * | 9/2003 | Colson ........................ | 349/114 |
| 7,002,648 | B2 * | 2/2006 | Iwasa .......................... | 349/113 |
| 7,158,205 | B2 * | 1/2007 | Yasukawa ................... | 349/158 |
| 7,388,633 | B2 * | 6/2008 | Iwasa .......................... | 349/113 |

FOREIGN PATENT DOCUMENTS

JP    2003-344824    12/2003

* cited by examiner

*Primary Examiner*—David Nelms
*Assistant Examiner*—Thanh-Nhan P Nguyen
(74) *Attorney, Agent, or Firm*—Renner, Kenner, Greive, Bobak, Taylor & Weber

(57) ABSTRACT

A liquid crystal display apparatus has a transparent substrate having a transparent common electrode formed thereon; an active matrix substrate having pixels with reflective pixel electrodes, the pixels being formed in column and row directions on the matrix substrate in a matrix fashion, each pixel having a switching transistor with a gate, a drain and a source, and a signal-charging capacitor; a liquid crystal layer provided between the common electrode and the pixel electrode; a column-signal electrode driver and a row-scanning electrode driver for activating the matrix substrate; column-signal electrodes connected to the column-signal electrode driver, the gate being connected to each column-signal electrode; and row-scanning electrodes connected to the row-scanning electrode driver, the drain being connected to each row-scanning electrode, each pixel electrode being provided at an intersection of each column-signal electrode and each row-scanning electrode, each pixel electrode and the capacitor being connected to the source. The matrix substrate has a first, a second, a third, and a fourth metal layer formed in order, via interlayer insulating layers between adjacent layers, on a wiring layer having the gate formed therein. The column-signal and row-scanning electrodes are formed in the first and second metal layers, respectively. Or, the column-signal electrodes and the row-scanning electrodes are formed in the second and the first layer, respectively. Wirings for carrying signals to be displayed are connected to the column-signal electrode driver, each wiring having a first wiring portion and a second wiring portion formed in the second and third metal layers, respectively, the first and second portions being electrically connected to each other through a via hole between the second and third metal layers.

4 Claims, 9 Drawing Sheets

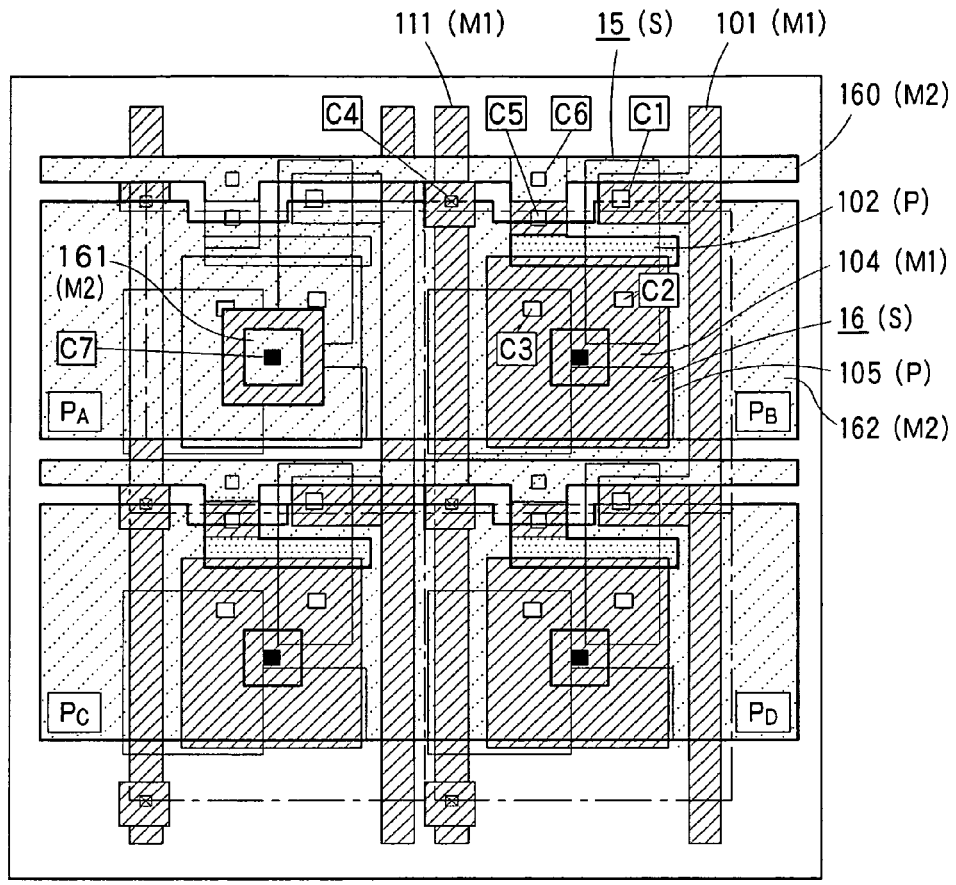
F I G. 8
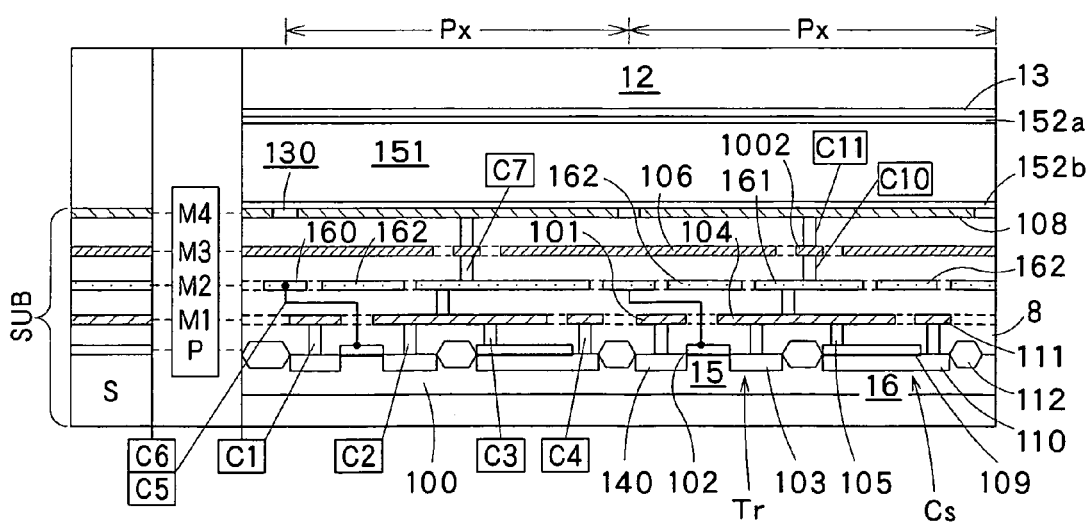
F I G. 9

REFLECTIVE ACTIVE MATRIX LIQUID CRYSTAL DISPLAY AND APPARATUS

CROSS-REFERENCE TO RELATED APPLICATIONS

This application is based on and claims the benefit of priority from the prior Japanese Patent Application No. 2004-347721 filed on Nov. 30, 2004, the entire content of which is incorporated herein by reference.

BACKGROUND OF THE INVENTION

The present invention relates to a reflective active matrix liquid crystal display apparatus applicable to projection liquid crystal display systems.

Reflective projection liquid crystal display systems are used for displaying video data output from computers or storage media, or through communications or broadcasting, etc.

In reflective active matrix liquid crystal display apparatus, pixels consist of reflective pixels electrodes, with transistors and wirings all arranged in layers beneath the reflective pixels electrodes. This structure allows high pixel density, such as, 10 µm or less for pixel pitch, and 0.3 to 0.6 µm for gaps between the reflective pixels electrodes, with no decrease in aperture ratio with a less noticeable aperture structure, for high definition display.

FIG. 1 is a sectional view showing a structure of pixels in a known reflective active matrix liquid crystal display apparatus.

Provided on a well 100 formed in a silicon substrate 110 are transistor areas 15 and capacitance areas 16. Formed in these areas 15 and 16 are a switching transistor Tr and a signal-charging capacitor Cs, respectively, for each pixel.

Pixels are isolated from one another by a field oxide film 112. Also isolated from one another by the film 112 are switching transistors Tr and signal-charging capacitors Cs.

A gate 102 of each switching transistor Tr and an upper electrode 105 of each signal-charging capacitor Cs are made of a polysilicon wiring layer formed on the silicon substrate 110 via an SiO$_2$ insulating layer 109, thus constituting a MIS (Metal Insulator Semiconductor) structure.

A column-signal electrode 101 is wired by a first metal layer formed on an upper layer on the polysilicon wiring layer via an insulating layer 8 so that it is electrically connected to a drain diffusion layer 140, one terminal of each switching transistor Tr, through a via hole C1. Connected to a source diffusion layer 103, another terminal of each transistor Tr, through a via hole C2 is an island-like electrode 104 formed in the first metal layer. The electrode 104 is connected to the electrode 105 of each signal-charging capacitor Cs through a via hole C3.

Formed in the capacitance areas 160 at the silicon substrate side are heavily doped diffusion layers 110 which are connected to one anther by wirings 111 formed in the first metal layer.

The island-like electrode 104 of the first metal layer is formed so that it completely covers the source diffusion layer 103 of the each transistor Tr, thus leaked light cannot reach the layer 103. This light-shielding structure prevents generation of photo carries in a semiconductor body formed in the source well, thus achieving signal-storing and display characteristics which are stable under intense light emission.

Also formed for shielding intense light emission is a shielding pattern 106 made of a second metal layer that is an upper layer on the first metal layer but a lower layer under the uppermost layer in which reflective pixel electrodes 108 are formed. The shielding pattern 106 has an island-like pattern 1002 isolated therefrom by a window 107.

Each pixel electrode 108 and the island-like electrode 104 that is a source wiring for each transistor Tr are connected to each other through a via hole C11, the island-like pattern 1002 and a via hole C10 so that the source diffusion layer 103 of each transistor Tr and the electrode 108 are connected to each other.

An insulating layer 120 that is a lower layer under the pixel electrodes 108 is polished before the electrodes 108 are formed so that its surface becomes optically flat. This is achieved by CMP (Chemical-Mechanical Polish).

A flattening layer 130 is formed to level off a mechanical step in a gap between adjacent pixel electrodes 108, which otherwise cause irregular alignment of liquid crystals and optical scattering, to prevent decrease in display contrast. Such a leveling-off process is, for example, an etch back process in which, after the pixel electrodes 108 are formed, an insulating layer of, for example SiO$_2$, is evenly deposited over the surface of the electrodes 108, and then etch-backed until the surface of the electrodes 108 are exposed.

A light-absorbing layer may be formed on both surfaces of the shielding pattern 106 or a rear surface of each pixel electrode 108 to restrict light multireflection on the second metal layer according to need.

Formed over the upper surface of each pixel electrode 108 is an alignment film 152a for initial molecule alignments of liquid crystal materials in a given direction, thus constituting an active matrix substrate SUB.

An alignment film 152b acting in the same way as the alignment film 152a is formed over the lower surface of a transparent common electrode 13 formed on a transparent substrate 12.

A liquid crystal layer 151 is provided between the active matrix substrate SUB and the transparent substrate 120 so that the alignment films 152a and 152b face each other, to vary incident light in accordance with a signal voltage at the pixel electrodes 108.

The known reflective active matrix liquid crystal display apparatus as described above has high aperture ratio and highly dense pixels.

The applicant of the present invention has developed a ultra-high resolution projection display with about 8 million pixels (3,840 and 2, 048 pixels in horizontal and vertical directions, respectively) for high aperture ratio and pixel density, attributed to the advantages discussed above.

Higher resolution for the known reflective active matrix liquid crystal display apparatus, however, cannot ignore delay characteristics of various drive signals in the apparatus, due to the fact that the higher the number of pixels is, the larger the panel size and the higher the operating frequency is.

FIGS. 2 and 3 illustrate delay of pulses in selection of row-scanning electrodes, which is a first problem for the known liquid crystal display apparatus.

In FIG. 2, row-selection pulses output from a row-scanning electrode driver 6 are transferred based on the characteristics of CR distribution constant circuits constituted by wiring resistors RG, parasitic capacitances $C_p$ and gate capacitances of switching transistors Tr (loads) of row-scanning electrodes G1, ..., GK, ... Row-selection pulses become more blunt in waveform and are more delayed as more distant from the driver 6 in a horizontal direction in a pixel area, such as, points A, B, C, and so on.

In the known liquid crystal display apparatus, row-scanning electrodes are made of a polysilicon wiring layer that forms the gate electrodes of the switching transistors Tr. This polysilicon exhibits higher specific resistance, with typical sheet resistance in the order of several ten Ω, than metal wiring materials, such as, aluminum.

Lower resistance for gate wiring layers is usually achieved by forming a silicide layer of, such as W, Ti and Ta, or a Ti-salicide layer on the polysilicon layer. It is however difficult to achieve lower resistance for the polysilicon wiring layer in the same level as the metal wiring layer of aluminum, for example.

Suppose that the above liquid crystal display apparatus having 4,000 horizontal pixels is fabricated with a pixel pitch of 10 μm.

When a row-scanning electrode wiring is provided by polysilicon having 10 Ω in sheet resistance, a wiring length is 40 mm and wiring resistance is in the range from 200 to 300 kΩ for 1.5-μm wiring width. Gate capacitance C is roughly estimated as 10 pF in combination of gate and wiring capacitances of 4,000 switching transistors Tr.

Under the estimation, delay (bluntness) of row-selection pulses when transferred along a row-scanning electrode is about 1 μsec. in maximum for rising and falling of pulses.

FIG. 3 illustrates various drive signal timings corresponding to the equivalent circuit shown in FIG. 2, illustrating delay in gate selection pulse transfer.

In FIG. 3, voltages $V_A$, $V_B$, $V_C$, . . . , are supplied to column-signal electrodes $D_A$, $D_B$, $D_C$, . . . These voltages are given when display signals are sequentially sampled in horizontal periods at the output of a horizontal-scanning horizontal shift register (not shown).

During a period in which a display signal in a k-th row horizontal period is sampled at a column-signal electrode, a row-selection pulse corresponding to an ON-level of a switching transistor Tr is supplied to a row-scanning electrode at the k-th row from a row-scanning electrode driver (not shown).

When sampling of the display signal in the k-th row horizontal period at all column signal electrodes in this row is finished, which corresponds to a horizontal blanking period just after the k-th row horizontal period (effective signal period), a pulse level from the row-scanning electrode driver is switched to an OFF-level so that the switching transistors Tr in the k-th row are switched from ON to OFF.

The above operation is repeated for each horizontal scanning cycle to sequentially charge display signals to pixels in the succeeding rows.

As described above, signal charge to pixels in each row is achieved by turning off the switching transistors Tr in the row in a horizontal blanking period so that a signal voltage sampled at the row-signal electrode in the row in each horizontal period is set as each pixel voltage.

The signal charge to pixels, however, suffers from delay in transfer of row-selecting pulses depending on the location of pixels at points, such as, the points A, B, C, shown in FIG. 3, having different distances from the row-scanning electrode driver 6, due to the row-selecting pulse delay characteristics discussed with reference to the equivalent circuit shown in FIG. 2.

In FIG. 3, at an operational timing at the point C with a large delay among the three points, a moment at which a row-selection pulse that has an ON-level during the k-th row horizontal effective period and is then switched to an OFF-level to set a pixel potential, overlaps with a display-signal sampling period in the succeeding (k+1)-th row effective horizontal period.

Such an overlap gives pixel voltages affected by an unstable reference voltage, crosstalk on capacitance couplings between circuit components while display signals are being input and sampled during horizontal sampling periods, etc., thus could cause generation of noises, so called streaking, depending on a pattern of displayed images, instability of pixel voltages and intensity, and so on in a horizontal direction.

Such a problem could be solved with horizontal blanking periods long enough between adjacent horizontal periods for a display signal. Longer horizontal blanking periods, however, cause a higher fundamental drive clock rate because pixel addressing is not carried out during horizontal blanking periods.

In the liquid crystal display apparatus having (4,000×2,000) pixels discussed above, for example, flickerless driving at a 120-Hz frame rate gives about 4 μsec. to one horizontal period. The 4-μsec. horizontal period with a 1-μsec. horizontal blanking period results in horizontal effective period/blanking period=3 μsec./1 μsec. with a blanking rate of about 25%. Such a blanking rate raises a horizontal sampling clock rate by about 33% with respect to a non-blanking signal.

A liquid crystal display apparatus having such a large number of pixels discussed above has a very high equivalent dot rate of about 1 GHz, thus operates at a lower operating frequency in the range from 20 to 25 MHz with, for example, parallel 48-phase division of input display signals.

For such a liquid crystal display apparatus, a longer blanking period discussed above is, however, a heavy burden to its liquid crystal display panel and drive system.

Discussed next with reference to FIGS. 4 and 5 is a second problem for the known liquid crystal display apparatus.

FIG. 4 is an equivalent circuit that illustrates delay of a drive signal along wiring in a display-signal sampling circuit included in a column-signal electrode driver connected to a liquid crystal panel 2 in the known liquid crystal display apparatus.

Supplied via an input terminal electrode $PD_s$ is a display signal Video that represents several display signals divided in a parallel multi-phase fashion.

The display signal Video is transferred along a common wiring $L_s$ and input to CMOS sampling switches $SW_1$ to $SW_m$. In detail, the display signal Video is transferred based on the characteristics of CR distribution constant circuits each constituted by a wiring resistance $R_{sig}$ and a wiring parasitic capacitance $C_{sig}$ of the common wiring $L_s$ and an input capacitance of each of the switches $SW_1$ to $SW_m$ (loads).

Supplied via an input terminal electrode $PD_c$ is a drive clock HCK that represents, for example, two drive clocks.

The drive clock HCK is transferred along a wiring $L_c$ and input to each stage of a horizontal shift register 4a of the column-signal electrode driver. In detail, the drive clock HCK is transferred based on the characteristics of CR distribution constant circuits each constituted by a wiring resistance $R_{ck}$ and a wiring parasitic capacitance $C_{ck}$ of the wiring $L_c$ and an input capacitance of each stage of the shift register 4a (a load).

FIG. 5 illustrates display signal waveforms at input terminals of the CMOS sampling switches $SW_1$ to $SW_m$ and their sampling timings. Waveforms $W_A$, $W_B$ and $W_C$ correspond to the points A, B and C, respectively, indicated in the equivalent circuit shown in FIG. 2, illustrating transfer delay.

FIG. 5 shows that display signals at the input terminals of the CMOS sampling switches have more blunt rising and falling waveforms as more distant from the input terminal electrode $PD_s$.

Reference signs P and Q shown in FIG. 5 indicate timings at which the display signals input to the sampling switches are sampled at the outputs of the shift register 4a of the row-signal electrode driver.

The display signal at the point C (FIG. 4), the most distant from the input terminal electrode $PD_s$, has the most blunt rising and falling waveforms among those at the points A, B and C and at the input terminals of the CMOS sampling switches.

As shown in FIG. 5, the display signal at the point C does not reach the levels of an original input display signal at the sampling timings P and Q, thus suffering from a voltage error $\Delta V$ to the original input signal.

As discussed above, the known reflective active matrix liquid crystal display apparatus has a low operating frequency by dividing display signals in a parallel multi-phase fashion.

The known reflective active matrix liquid crystal display apparatus, however, suffers from waveform bluntness for display signals due to the signal transfer characteristics discussed above. Larger waveform bluntness causes generation of double images known as ghosts due to false signals on horizontal pixel locations corresponding to the number of display signals divided in a parallel multi-phase fashion, thus lowering image quality.

Ghost images could be removed by phase adjustments to the display signal Video and the drive clock HCK to the horizontal sift register 4a in FIG. 4. However, waveform bluntness in the direction of wiring due to the characteristics of distribution constant circuits forces highly precise adjustments to phases of the display signal Video and the drive clock HCK, and also transfer delay characteristics in the liquid crystal display panel 2001. Such adjustments restrict design freedom for liquid crystal display panels.

Delay in signal transfer along wrings discussed above could also be eliminated by lowering wiring resistance with a wider wiring width. However, a wider wiring width causes a larger wiring parasitic capacitance.

As discussed above, it is difficult to improve the transfer characteristics of the known reflective active matrix liquid crystal display apparatus.

SUMMARY OF THE INVENTION

A purpose of the present invention is to provide a reflective active matrix liquid crystal display apparatus that shows high-resolution and high-quality display performances.

The present invention provides a liquid crystal display apparatus comprising: a transparent substrate including a transparent common electrode formed thereon; an active matrix substrate including a plurality of display pixels having reflective pixel electrodes, the display pixels being formed in a column direction and a row direction on the active matrix substrate in a matrix fashion, each display pixel including a switching transistor having a gate, a drain and a source, and a signal-charging capacitor; a liquid crystal layer provided between the common electrode and the reflective pixel electrode; a column-signal electrode driver and a row-scanning electrode driver for activating the active matrix substrate; a plurality of column-signal electrodes connected to the column-signal electrode driver, the gate of the switching transistor being connected to each column-signal electrode; and a plurality of row-scanning electrodes connected to the row-scanning electrode driver, the drain of the switching transistor being connected to each row-scanning electrode, each reflective pixel electrode being provided at an intersection of each column-signal electrode and each row-scanning electrode, each reflective pixel electrode and the signal-charging capacitor being connected to the source of the switching transistor, wherein the active matrix substrate further includes at least a first metal layer, a second metal layer, a third metal layer, and a fourth metal layer formed in order, via interlayer insulating layers between adjacent metal layers, on a wiring layer having the gate of the switching transistor formed therein, the column-signal electrodes and the row-scanning electrodes being formed in the first metal layer and the second metal layer, respectively.

Moreover, the present invention provides a liquid crystal display apparatus comprising: a transparent substrate including a transparent common electrode formed thereon; an active matrix substrate including a plurality of display pixels having reflective pixel electrodes, the display pixels being formed in a column direction and a row direction on the active matrix substrate in a matrix fashion, each display pixel including a switching transistor having a gate, a drain and a source, and a signal-charging capacitor; a liquid crystal layer provided between the common electrode and the reflective pixel electrode; a column-signal electrode driver and a row-scanning electrode driver for activating the active matrix substrate; a plurality of column-signal electrodes connected to the column-signal electrode driver, the gate of the switching transistor being connected to each column-signal electrode; and a plurality of row-scanning electrodes connected to the row-scanning electrode driver, the drain of the switching transistor being connected to each row-scanning electrode, each reflective pixel electrode being provided at an intersection of each column-signal electrode and each row-scanning electrode, each reflective pixel electrode and the signal-charging capacitor being connected to the source of the switching transistor, wherein the active matrix substrate further includes at least a first metal layer, a second metal layer, a third metal layer, and a fourth metal layer formed in order, via interlayer insulating layers between adjacent metal layers, on a wiring layer having the gate of the switching transistor formed therein, the column-signal electrodes and the row-scanning electrodes being formed in the second metal layer and the first metal layer, respectively.

Furthermore, the present invention provides a liquid crystal display apparatus comprising: a transparent substrate including a transparent common electrode formed thereon; an active matrix substrate including a plurality of display pixels having reflective pixel electrodes, the display pixels being formed in a column direction and a row direction on the active matrix substrate in a matrix fashion, each display pixel including a switching transistor having a gate, a drain and a source, and a signal-charging capacitor; a liquid crystal layer provided between the common electrode and the reflective pixel electrode; a column-signal electrode driver and a row-scanning electrode driver for activating the active matrix substrate; a plurality of column-signal electrodes connected to the column-signal electrode driver, the gate of the switching transistor being connected to each column-signal electrode; and a plurality of row-scanning electrodes connected to the row-scanning electrode driver, the drain of the switching transistor being connected to each row-scanning electrode, each reflective pixel electrode being provided at an intersection of each column-signal electrode and each row-scanning electrode, each reflective pixel electrode and the signal-charging capacitor being connected to the source of the switching transistor, wherein the active matrix substrate further includes at least a first metal layer, a second metal layer, a third metal layer, and a fourth metal layer formed in order, via interlayer insulating layers between adjacent metal layers, on a wiring layer having the gate of the switching transistor formed therein, a plurality of first wirings for carrying signals to be displayed being connected to the column-signal electrode driver, each first wiring having a first wiring portion formed in the second metal layer and a second wiring portion formed in the third metal layer, the first and second wiring portions being electrically connected to each other through a via hole between the second and third metal layers.

BRIEF DESCRIPTION OF DRAWINGS

FIG. 8 is a plan view illustrating a top-view structure of a part of a liquid crystal panel of a first embodiment of a reflective active matrix liquid crystal display apparatus according to the present invention;

FIG. 9 is an illustration of a sectional-view structure that corresponds to the top-view structure shown in FIG. 8;

DETAILED DESCRIPTION OF PREFERRED EMBODIMENTS

Figure 1:
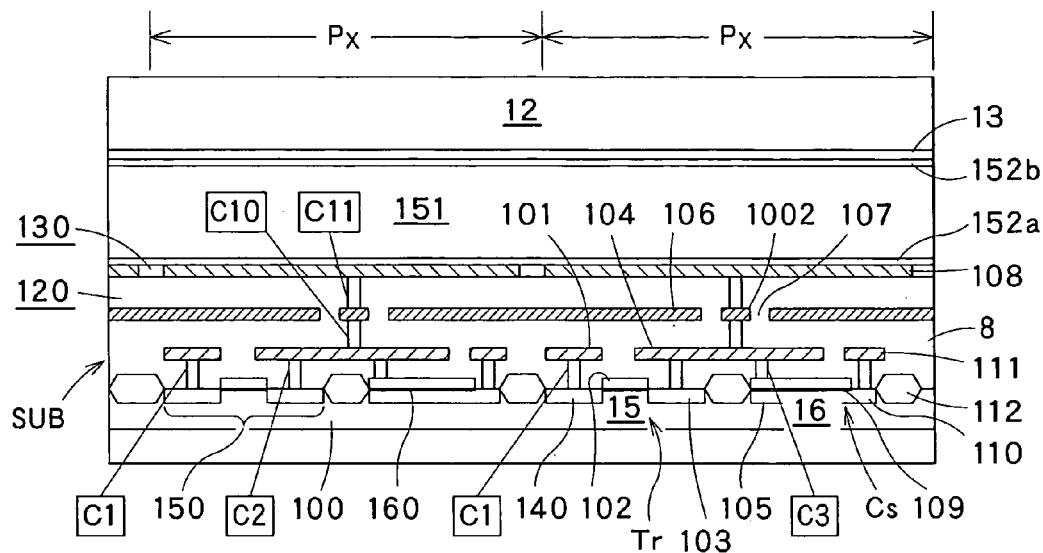
FIG. 1 is a sectional view showing a structure of pixels in a known reflective active matrix liquid crystal display apparatus.

Several preferred embodiments of a reflective active matrix liquid crystal display apparatus according to the present invention will be disclosed.

In the drawings which will be referred to for describing the embodiments of the present invention, elements that are the same or analogous to those shown in the drawings for the known liquid crystal display apparatus are given the same reference numerals or signs, hence, the details thereof being omitted for brevity.

Figure 6:
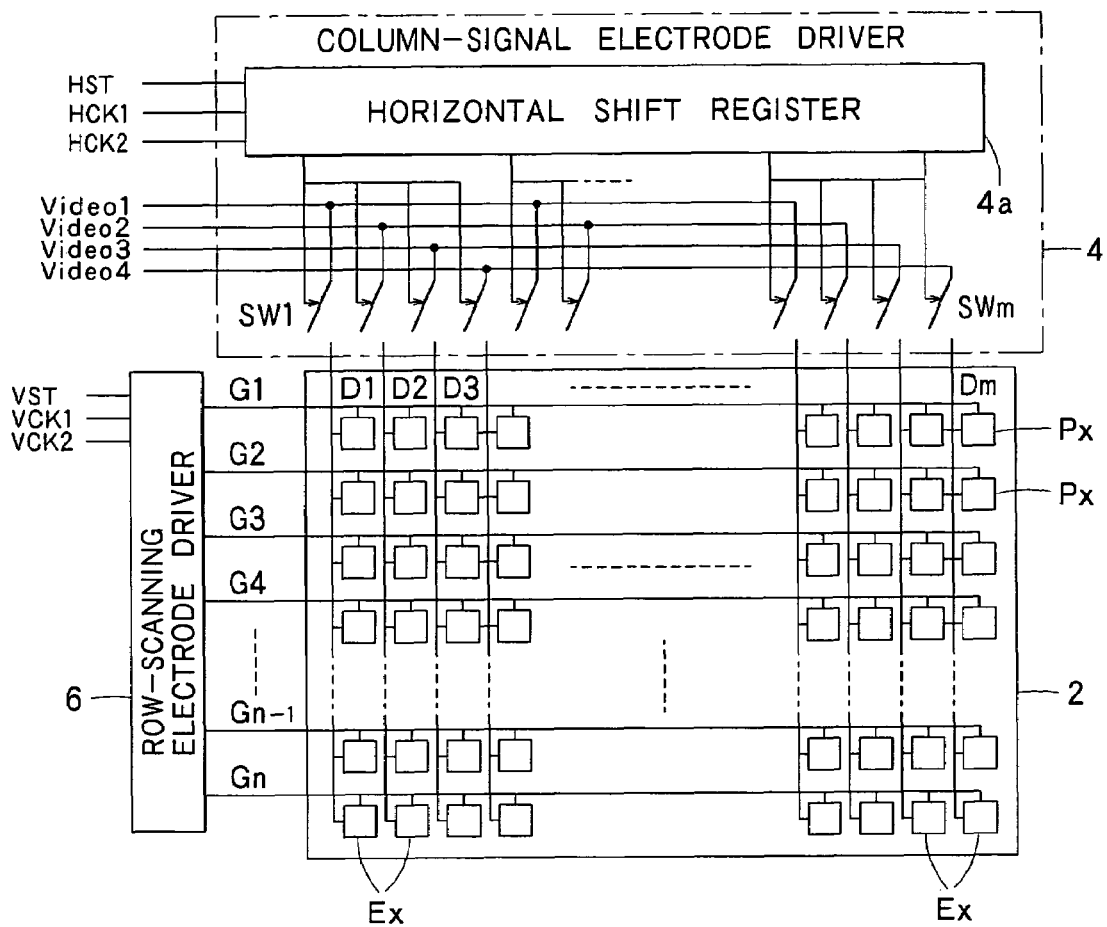
FIG. 6 is a schematic view of driving circuitry formed in a liquid crystal panel used in a reflective active matrix liquid crystal display apparatus.

FIG. 6 is a schematic view of driving circuitry formed in a liquid crystal panel used in a reflective active matrix liquid crystal display apparatus.

A liquid crystal panel 2 is provided on an active matrix substrate (not shown) that is a semiconductor substrate. Provided at one side of the panel 2 is a column-signal electrode driver 4. Provided at another side of the panel 2 is a row-signal electrode driver 6. Formed on the panel 2 are a plurality of column-signal electrodes D1 to Dm. Also formed on the panel 2 as intersecting with the electrodes D1 to Dm are a plurality of row-scanning signal electrodes G1 to Gn. Intersection points of the electrodes D1 to Dm and G1 to Gn are display pixels Px. Thus, the display pixels Px are arranged in a matrix in vertical and horizontal directions.

The column-signal electrode driver 4 has a horizontal shift register 4a and a set of switching circuits SW1 to SWm. The shift register 4a is driven by drive signals, such as, a horizontal start signal HST and horizontal transfer clocks HCK1 and HCK2 supplied from a drive timing generator (not shown). The shift register 4a sequentially outputs on-pulses to the switching circuits SW1 to SWm to sample display signals Video1 to Video4 at the corresponding column-signal electrodes D1 to Dm.

The signals Video1 to Video4 are input to the switching circuits SW1 to SWm from an external driver (not shown) via four display signal input lines. The external driver divides an original display signal (a signal to be displayed) into the four display signals Video1 to Video4 in a parallel multi-phase fashion and supplies the signals Video1 to Video4 to the liquid crystal panel 2.

Division of the display signal in the parallel multi-phase fashion lowers the sampling rate at the column-signal electrode driver 4 and also the liquid crystal panel 2.

The display signals Video1 to Video4 supplied to the liquid crystal panel 2 are inverted positively and negatively with respect to a reference potential for each vertical scanning period by another external driver (not shown), for driving liquid crystals with a positive-negative symmetrical alternating voltage.

The row-signal electrode driver 6 has a vertical shift register (not shown). The vertical shift register is driven by drive signals, such as, a vertical start signal VST and vertical transfer clocks VCK1 and VCK2 supplied from a drive timing generator (not shown). The vertical shift register sequentially outputs row-selection pulses to the row-scanning signal electrodes G1 to Gn for each vertical period of the display signals.

Figure 7:
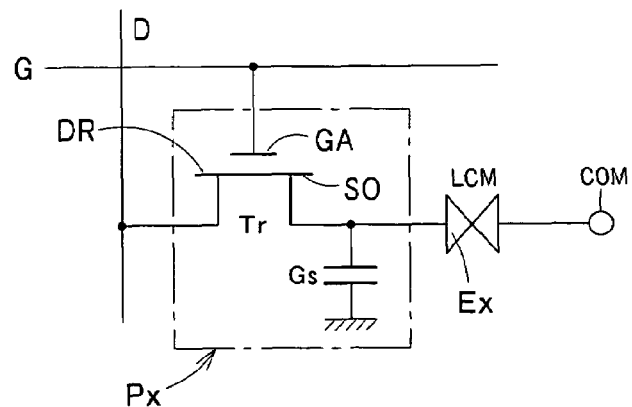
FIG. 7 is a circuit constituting each display pixel.

Located at each of the intersection points of the column-signal electrodes D1 to Dm and the row-scanning signal electrodes G1 to Gn is a display pixel Px, such as, shown in FIG. 7.

Reference signs D and G in FIG. 9 represent the column-signal electrodes D1 to Dm and the row-scanning signal electrodes G1 to Gn, respectively.

Each display pixel Px has a switching transistor Tr, a signal-charging capacitor Cs, a pixel electrode Ex, and a liquid crystal layer LCM that is shared by all display pixels Px. The column-signal and row-scanning signal electrodes D and G are connected to a drain DR and a gate GA, respectively, of the switching transistor Tr. The signal-charging capacitor Cs and the pixel electrode Ex are both connected to a source SO of the switching transistor Tr.

The liquid crystal layer LCM is sealed between the active matrix substrate having pixel circuits, each shown in FIG. 7, formed thereon, and a transparent common electrode COM.

In operation, the row-selection pulses for selection among the row-scanning signal electrodes G1 to Gn are supplied to the pixel circuits via a selected electrode G. Transistors Tr in one row are sequentially turned on for each horizontal period. A display-signal voltage sampled at the column-signal electrode D is charged in the signal-charging capacitor Cs via the switching transistor Tr. This display-signal voltage is stored in capacitor Cs for a non-selected period and until a new display-signal voltage is charged in a succeeding vertical scanning period. Thus, the liquid crystal layer LCM corresponding to each pixel Px is driven by the display-signal voltage corresponding to a display signal.

The active matrix substrate is not required to be transparent in reflective active matrix liquid crystal display apparatus. Any common semiconductor substrate, such as a silicon substrate, can be used as the active matrix substrate.

A silicon active matrix substrate allows fabrication of semiconductor devices, such as, transistors that exhibit excellent transistor characteristics, such as, off-leakage characteristics and current v. s. voltage characteristics. Therefore, not only the pixel circuits, but also peripheral circuits, such as, the column-signal electrode driver 4 and the row-scanning electrode driver 6, can be easily fabricated on the one and same silicon active matrix substrate.

First Embodiment

FIG. 8 is a plan view illustrating a top-view structure of a part of a liquid crystal panel of a first embodiment of a reflective active matrix liquid crystal display apparatus according to the present invention. In detail, FIG. 1 illustrates a top-view structure of each of (2×2) pixels in zones $P_A$, $P_B$, $P_C$ and $P_D$.

FIG. 9 illustrates a sectional-view structure that corresponds to the top-view structure shown in FIG. 8.

Illustrated at the left side of FIG. 9 is a stack of several metal layers. An active matrix substrate SUB in this invention has a 4-layer metal substrate structure in which a first metal layer M1, a second metal layer M2, a third metal layer M3, and a fourth metal layer M4 are formed in order, via interlayer insulating layers between adjacent metal layers, on a polysilicon wiring layer P. The layer P forms the gates of switching transistors on a silicon substrate S with an impurity doped layer and a gate oxide layer. The interlayer insulating layers are provided between adjacent metal layers.

Metal layers illustrated in FIG. 8 are only the first and second metal layers M1 and M2, for simplicity.

Moreover, in FIG. 8, four pixels Pxs in the zones $P_A$, $P_B$, $P_C$ and $P_D$ have the identical structures. However, for easier understanding of pattern arrangements and their connectional relationship on the metal layers, a stack of the metal layers M1 and M2 is illustrated only for the pixel Px in the zone PA, whereas, the stack layers are illustrates so that, from the upper second layer M2, the lower first layer M1 and, if necessary, further lower layers (not metal layers) can be seen, for the other pixels Pxs in the zones $P_B$, $P_C$ and $P_D$.

Moreover, in FIG. 8, reference signs, such as, 16(S), 102 (P), 111(M1) and 160(M2) indicate that patterns 16, 102, 111 and 160 are formed in the silicon substrate S, the polysilicon layer P, the first metal layer M1 and the second metal layer M2, respectively.

Disclosed below with reference to FIGS. 8 and 9 is a structure of the first embodiment of the reflective active matrix liquid crystal display apparatus according to the present invention.

Provided on a well 100 formed on an upper layer of the silicon substrate S are a transistor area 15 and a capacitance area 16. Each pixel Px and also a transistor Tr and a signal-charging capacitor Cs of each pixel Px are isolated from one another by a field oxide film 112. A gate 102 (corresponding to the gate GA in FIG. 7) of the transistor Tr and an electrode 105 of the capacitor Cs are formed in the polysilicon layer P, thus constituting, so-called, an MIS (Metal Insulator Semiconductor) structure with respect the silicon substrate S via an $SiO_2$ insulating layer 109.

A column-signal electrode 101 (corresponding to the column-signal electrode D in FIG. 7) is wired by the first metal layer M1 formed on the upper layer of the polysilicon layer P via an insulating film 8 and connected to a drain diffusion area 140 (corresponding to the drain DR in FIG. 7) of the transistor Tr through a via hole C1. Such a via hole may be referred to as a contact or through hole. An island-like electrode 104 formed in the first metal layer M1 is connected to a source diffusion area 103 (corresponding to the source SO in FIG. 7) of the transistor Tr through a via hole C2. The electrode 104 is also connected to the electrode 105 of the capacitor Cs through a via hole C3.

Formed in the capacitance areas 16 at the silicon substrate (S) side are heavily doped diffusion layers 110 which are connected to wirings 111 formed in the first metal layer M1 through a via hole C4 and connected to one another in the column direction.

Figure 2:
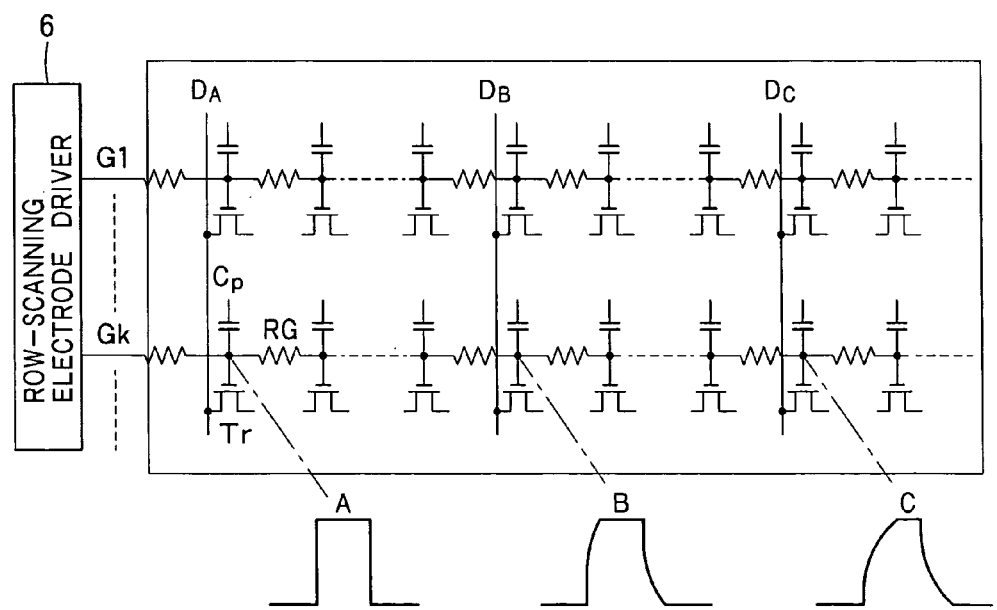
FIG. 2 is an equivalent circuit illustrating delay of pulses in selection of row-scanning electrodes of the known liquid crystal display apparatus.
Figure 3:
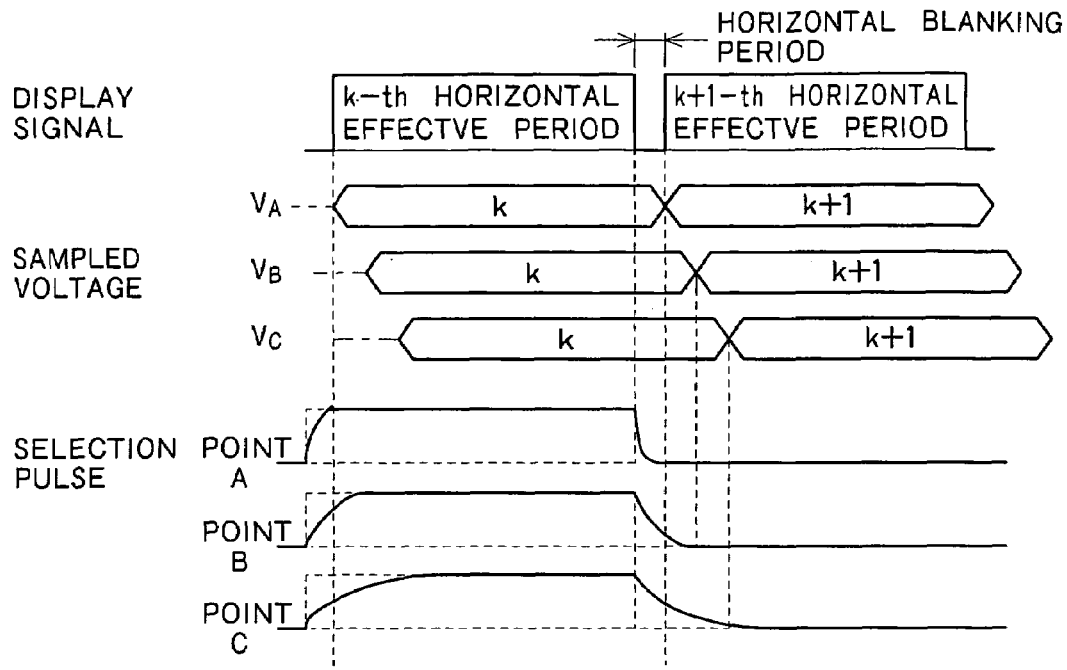
FIG. 3 is an illustration of timing and waveforms illustrating delay of pulses in selection of row-scanning electrodes of the known liquid crystal display apparatus.
Figure 4:
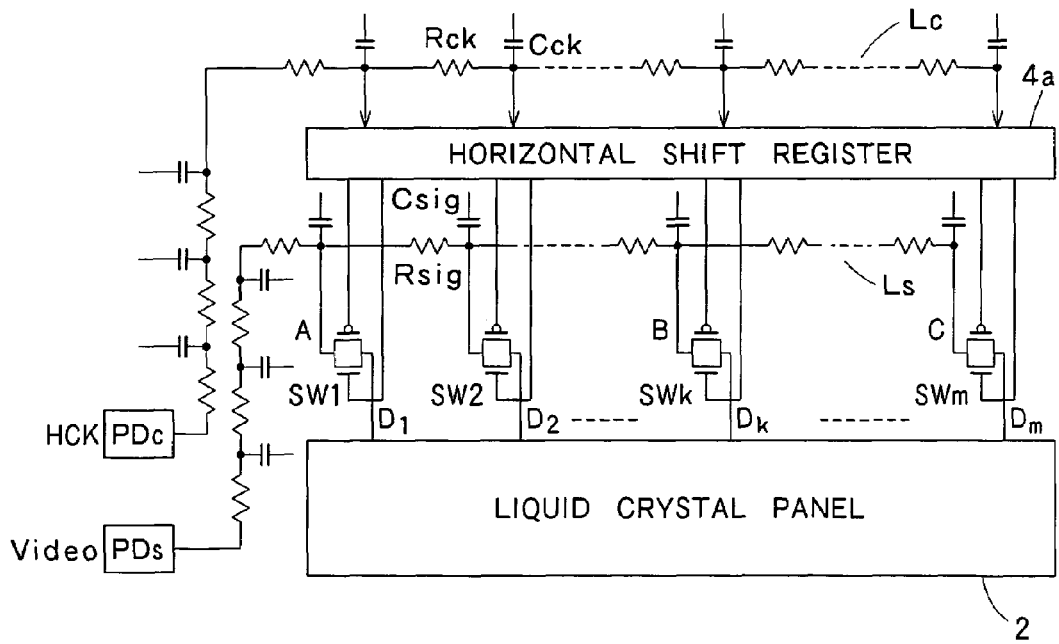
FIG. 4 is an equivalent circuit illustrating delay of a drive signal along wiring in a display-signal sampling circuit included in a column-signal electrode driver in the known liquid crystal display apparatus.

The gate 102 (made by the polysilicon layer P) of the transistor Tr is connected to a rectangular electrode (not shown in FIG. 2) formed like an island in the first metal layer M1 through a via hole C5. Moreover, the gate 102 is connected to a row-scanning electrode 160 (corresponding to the row-scanning electrode G in FIG. 7) formed in the second metal layer M2, through a via hole C6.

In the known reflective active matrix liquid crystal display apparatus, each row-scanning electrode is formed in a polysilicon wiring layer, the same as the gate of each transistor.

Figure 5:
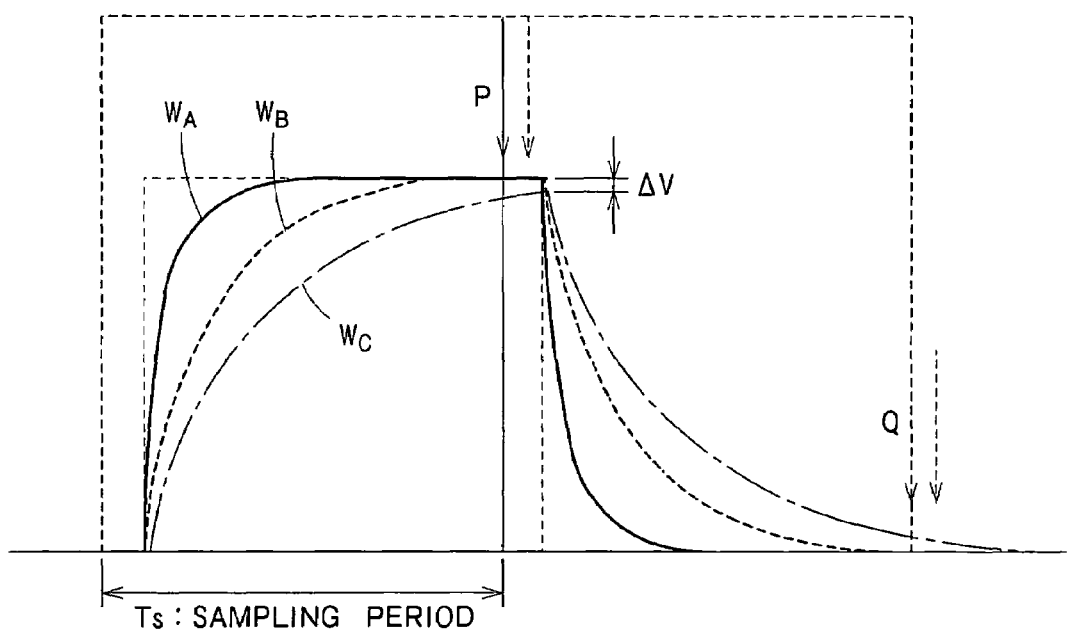
FIG. 5 is an illustration of display signal waveforms at input terminals of CMOS sampling switches and their sampling timings in the known liquid crystal display apparatus.

Contrary to this, in the first embodiment of the present invention, each row-scanning electrode 160 is formed in the second metal layer M2 situated over the first metal layer M1 in which each column-signal electrode 101 is formed. This construction achieves decrease in wring resistance of the electrode 160 by 1/10 or more compared to the known polysilicon-gate reflective active matrix liquid crystal display apparatus. Thus, the first embodiment can markedly reduce delay in transfer of row-selection pulses to the row-scanning electrodes and their distortion discussed with respect to FIGS. 24 to 5.

Also formed in the second metal layer M2, besides the wiring pattern for each row-scanning electrode 160, are an island-like electrode 161 for connecting the source diffusion area 103 (the source SO) of each transistor Tr to the upper layers, and a fixed-potential electrode 162 that isolates the electrodes 160 and 161 from each other and prevents leakage of light to the lower layers. The electrode 162 is formed so that it surrounds the electrode 161 that is formed in the second metal layer M2 and connected to the island-like electrode 104 (for source connection) formed in the first metal layer M1 through a via hole C7.

As disclosed above, the first embodiment employs the fixed-potential electrode 162 provided between the row-scanning electrode 160 and the island like electrode 161 (for source connection) in the second metal layer M2, for preventing leakage of light to the lower layers, thus achieving higher light-shielding capability compared to the known reflective active matrix liquid crystal display apparatus.

Moreover, the fixed-potential electrode 162 decreases gate-to-source parasitic capacitance junction in each transistor Tr, thus restricting a gate-to-source field through voltage that is inevitably applied to the source of each transistor Tr by row-selection pulses in switching operations.

In FIG. 9, formed in the third metal layer M3 is an island-like pattern 1002 for source connection. Also formed in the layer M3 is a light-shielding pattern 106 that covers the areas of the layer except openings or slits of the pattern 1002.

It is preferable that the openings or slits of the island-like pattern 1002 formed in the third metal layer M3, the openings or slits of the island-like electrode 161 formed in the second metal layer M2, and openings or slits 130 (with a flattening layer formed therein) between the pixel electrodes 108 formed in the fourth metal layer M4 are not overlapped with each other.

In the arrangements disclosed above, light incident through the openings or slits 130 between the pixel electrodes 108 formed in the fourth metal layer M4 is shielded by the third and second metal layers M3 and M2 having the openings or slits with different locations, thus exhibiting high light shielding capability.

The via holes C7, C10 and C11 for connections to the pixel electrodes 108 may be arranged in a, so-called "stacked via" structure in which the via holes are aligned at the identical locations in the vertical direction, by an embedding technique for tungsten plugs, for example.

Figure 10:
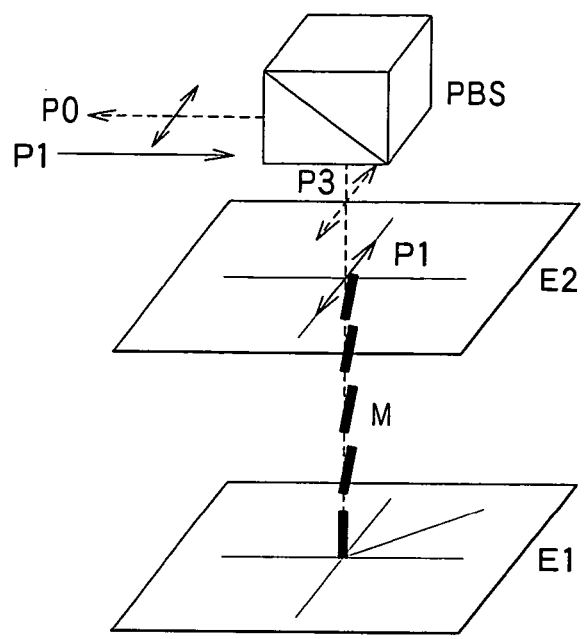
FIG. 10 is an illustration of a normally black display mode that employs liquid crystals having negative dielectric anisotropy with initial orientation almost perpendicular to substrates.
Figure 11:
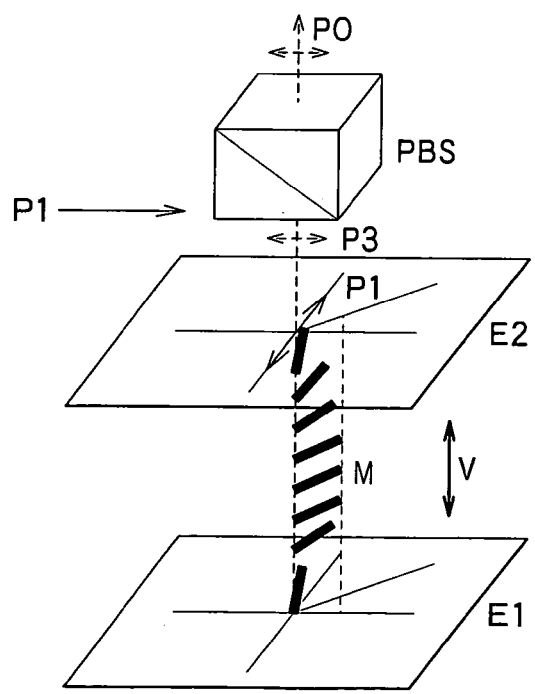
FIG. 11 is another illustration of a normally black display mode that employs liquid crystals having negative dielectric anisotropy with initial orientation almost perpendicular to substrates.

Illustrated in FIGS. 10 and 11 is a normally black display in a birefringence mode that is an applicable display mode for the reflective active matrix liquid crystal display apparatus according to the present invention.

A normally black display mode employs liquid crystals having negative dielectric anisotropy, with initial orientation almost perpendicular to the substrates.

As illustrated in FIG. 10, liquid crystal molecules M are oriented almost perpendicular to substrates E1 and E2, with a slight inclination toward a particular direction when no voltage is applied. This initial alignment with slight inclination is given so that all of the molecules M incline toward a particular direction when a voltage is applied. An alignment film with such initial alignment is obtained, for example, by $SiO_2$-oblique deposition.

When no voltage is applied, in FIG. 10, no birefringence effects occur, so that an incident light beam P1 from a light source (not shown) is polarized into a linearly-polarized light PI by a polarization beam splitter PBS. No birefringence effects give an output linearly-polarized light P3, reflected by pixel electrodes, having the same polarization as the linearly-polarized light PI. The output light P3 is then returned (PO) to the light source side, thus black being displayed on a screen (not shown).

In contrast, when a voltage V is applied, the liquid crystal molecules M are aligned in a particular direction, as illustrated in FIG. 11. Birefringence effects due to difference in refraction index on the long and short axes of each molecule M make changes in phase difference to the polarized light components. Thus, the output light P3 changes from an elliptically-polarized light to a circularly-polarized light, and to an linearly-polarized light orthogonal to the linearly-polarized light PI (the incident light beam P1), depending on retardation levels with parameters of orientation of the molecules M in response to the applied voltage, total optical length corresponding to a gap of the liquid crystals and a wavelength of the incident light beam P1. The linearly-polarized light orthogonal to the linearly-polarized light PI is returned to the polarization beam splitter PBS, emitted therefrom (PO) to a projection lens (not shown), and then displayed on the screen in the rage from gray to white depending on a voltage applied to each pixel electrode.

Described above is a normally black display mode in which black is displayed when no voltage is applied. No birefringence effects occur while black is being displayed. Thus, a normally black display mode exhibits no wavelength dependency with lower signal voltage level in displaying black, thus offering high contrast display characteristics.

Another display mode using birefringence effects also applicable to the reflective active matrix liquid crystal display apparatus according to the present invention is a reflective TN mode for normally white display. A reflective TN mode employs liquid crystals having positive dielectric anisotropy that are confined between two substrates as being twisted in initial orientation. When a voltage is applied, liquid crystal molecules are aligned in a direction of electric field for normally white display.

Second Embodiment

Figure 12:
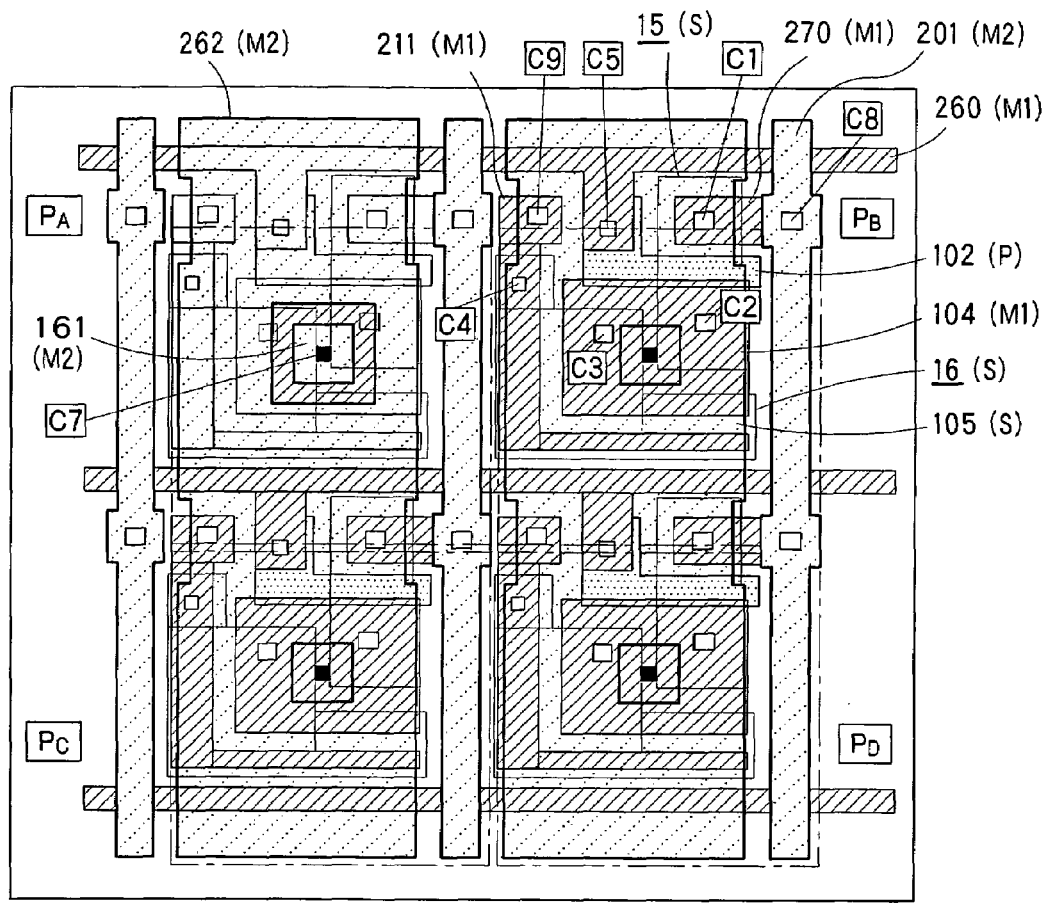
FIG. 12 is a plan view illustrating a top-view structure of a part of a liquid crystal panel of a second embodiment of a reflective active matrix liquid crystal display apparatus according to the present invention.
Figure 13:
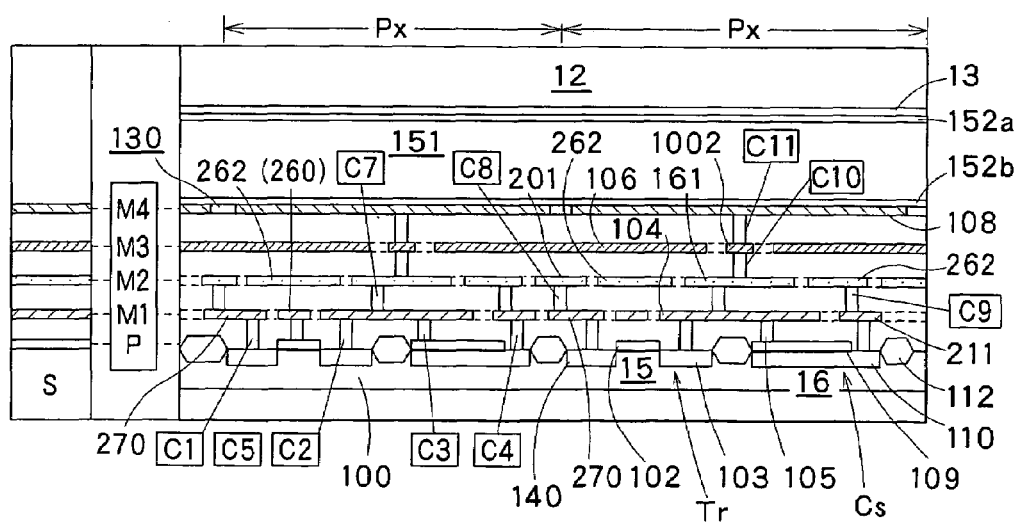
FIG. 13 is an illustration of a sectional-view structure that corresponds to the top-view structure shown in FIG. 12.

Disclosed with reference to FIGS. 12 and 13 is a second embodiment of a reflective active matrix liquid crystal display apparatus according to the present invention.

A major difference between the first and second embodiments lies in the locations of row-scanning and column-signal electrodes. In detail, in the former, the row-scanning electrodes 160 are formed in the upper second metal layer M2 whereas, in the latter, the counterpart electrodes 260 are formed in the lower first metal layer M1, as disclosed below.

FIGS. 12 and 13 are drawn in the same way and given the same reference numerals or signs for the same or analogous layers and components as FIGS. 8 and 9, respectively, hence, the details thereof being omitted for brevity.

A drain diffusion area 140 (corresponding to the drain DR in FIG. 7) of each transistor Tr is connected to an island-like electrode 270 formed in a first metal layer M1, an upper layer of a polysilicon wiring layer P, through a via hole C1. Connected to a source diffusion area 103 (corresponding to the source SO in FIG. 7) of each transistor Tr through a via hole C2 is an island-like electrode 104 also formed in the layer M1. The electrode 104 is connected to an electrode 105 of each signal-charging capacitor Cs through a via hole C3.

Formed in each capacitance area 16 at the silicon substrate (S) side is a heavily doped diffusion layer 110 which is connected to a wiring 211 formed in the first metal layer M1 through a via hole C4.

A gate 102 of each transistor Tr is connected to a row-scanning electrode 260 (corresponding to the row-scanning signal electrode G in FIG. 7) formed in the first metal layer M1, through a via hole C5. The gate 102 of each transistor Tr and the electrode 105 of each signal-charging capacitor Cs are formed in the polysilicon layer P, thus constituting an MIS structure, like the first embodiment. A plurality of gates 102 are connected to one another in each row. a multiple of such gate connections are made parallel in the row direction.

As already discussed, in the known reflective active matrix liquid crystal display apparatus, each row-scanning electrode is formed in a polysilicon wiring layer, the same as the gate of each transistor.

On the contrary, in the second embodiment, each row-scanning electrode 260 is formed in the first metal layer M1. This construction achieves decrease in wring resistance of the electrode 260 by 1/10 or more compared to the known polysilicon-gate reflective active matrix liquid crystal display apparatus. Thus, the second embodiment can markedly reduce delay in transfer of row-selection pulses to the row-scanning electrodes and their distortion discussed with respect to FIGS. 2 to 5.

Also formed in the first metal layer M1 is a wiring area 211 for use in supplying a fixed potential to each capacitance area 16. The wiring area 211 is provided between the island-like electrode 104 for use in connection of the source of a transistor Tr of one pixel and the row-scanning electrode 260 for another pixel adjacent to this pixel. The pattern arrangements for this structure diminishes effects of parasitic capacitance between patterns for the source of the transistor Tr of the pixel and the gate of a transistor Tr of the other pixel.

Formed in a second metal layer M2 is a column-signal electrode 201 (corresponding to the column-signal electrode D in FIG. 7). Connected to the electrode 201, through a via hole C8, is a island-like electrode 270 (formed in the first metal layer M1) for use in connection of the drain of each transistor Tr.

Also formed in the second metal layer M2, besides the column-signal electrode 201, are an island-like electrode 161 for source connection for each transistor Tr to the upper layers and a fixed-potential electrode 262 that isolates the electrodes 201 and 161 from each other and prevents leakage of light to the lower layers. The electrode 262 is formed so that it surrounds the electrode 161.

As disclosed above, the second embodiment employs the fixed-potential electrode 262 provided between the column-signal electrode 201 and the island-like electrode 161 in the second metal layer M2, for preventing leakage of light to the lower layers, thus exhibiting higher light-shielding capability compared to the known reflective active matrix liquid crystal display apparatus.

Moreover, the fixed-potential electrode 262 formed in the second metal layer M2 is connected to the wiring area 211 formed in the first metal layer M1, through a via hole C9. This structure allows the electrode 262 formed as aligned with the column-signal electrode 201 in the same layer to supply a well reference voltage to the common terminal of each capacitance area 16 and each transistor Tr, thus producing proper impedance to charging and discharging passages in signal sampling operation to the electrode 201.

Furthermore, in FIG. 13, an island-like pattern 1002 for use in connection of the source of each transistor Tr is formed in a third metal layer M3. Also formed in the layer M3 is a shielding pattern 106 that covers the areas of the layer except openings or slits of the pattern 1002.

It is preferable that the openings or slits of the island-like pattern 1002 formed in the third metal layer M3, the openings or slits of the island-like electrode 161 formed in the second metal layer M2, and openings or slits 130 (with a flattening formed therein) between the pixel electrodes 108 formed in the fourth metal layer M4 are not overlapped with each other.

In the arrangements disclosed above, light incident through the openings or slits 130 between the pixel electrodes 108 formed in the fourth metal layer M4 is shielded by the third and second metal layers M3 and M2 having the openings or slits with different locations, thus exhibiting high light shielding capability.

Also in the second embodiment, the via holes C7, C10 and C11 for connections to the pixel electrodes 108 may be arranged in a, so-called "stacked via" structure in which the via holes are aligned at the identical locations in the vertical direction, by an embedding technique for tungsten plugs, for example.

As disclosed above, the first and second embodiments of the reflective active matrix liquid crystal display apparatus according to the present invention employ the metal layer of low wiring resistance in wiring the row-scanning electrodes. Thus, the first and second embodiments can markedly reduce delay in transfer of row-selection pulses to the row-scanning electrodes and their distortion discussed with respect to FIGS. 2 to 5, with high light shielding capability.

Third Embodiment

Figure 14:
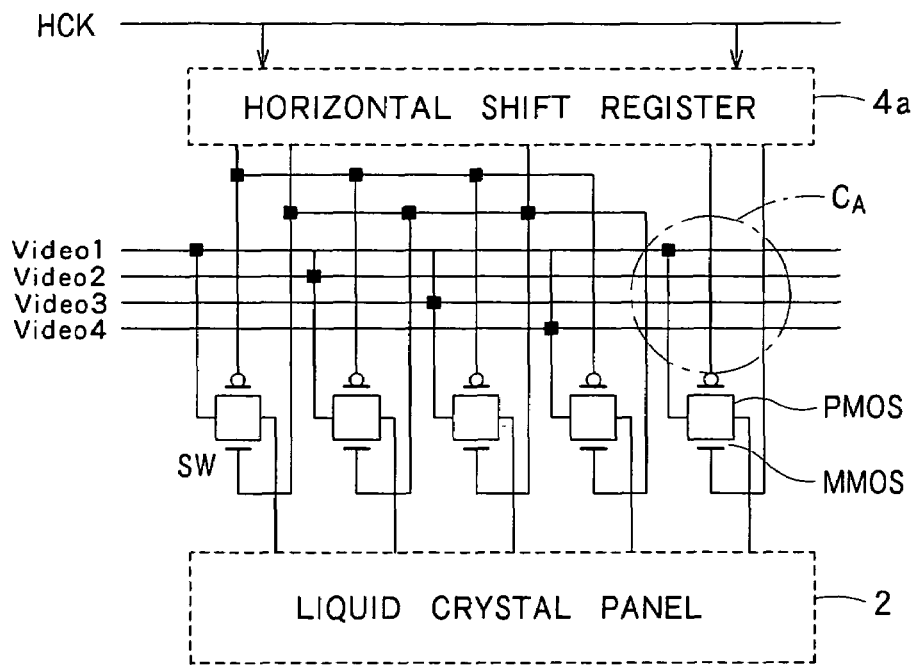
FIG. 14 shows a sampling circuit of a row-signal electrode driver used in a third embodiment of a reflective active matrix liquid crystal display apparatus according to the present invention.
Figure 15:
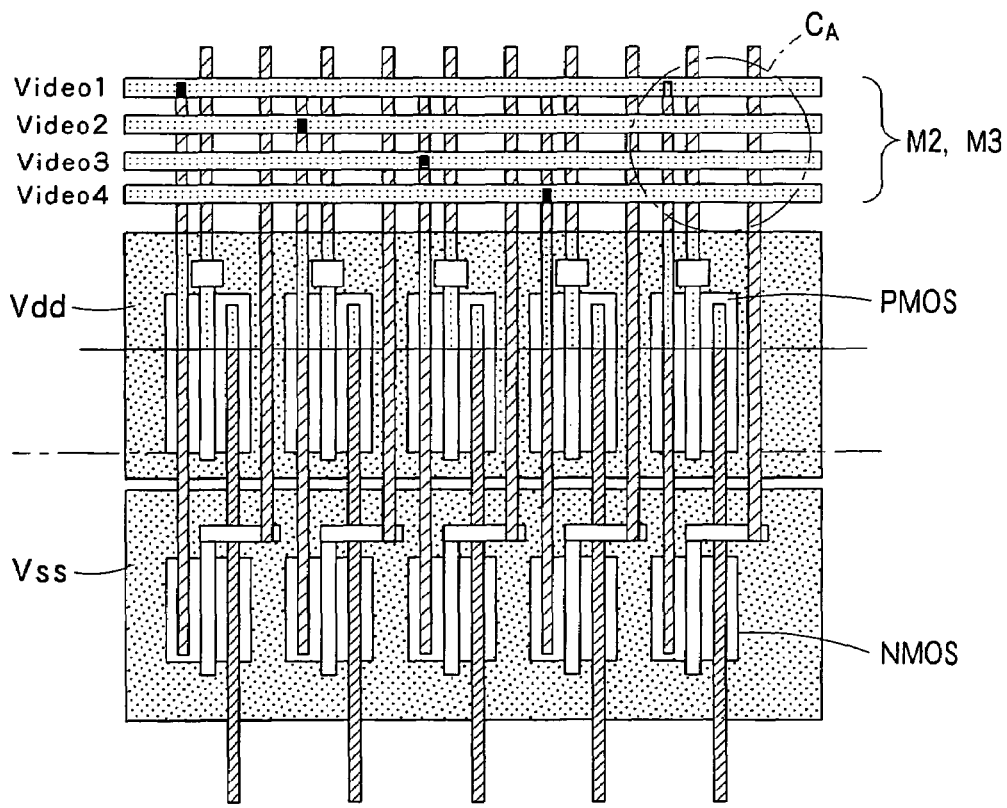
FIG. 15 is a plan view illustrating wiring patterns for sampling switches of the sampling circuit shown in FIG. 14.
Figure 16:
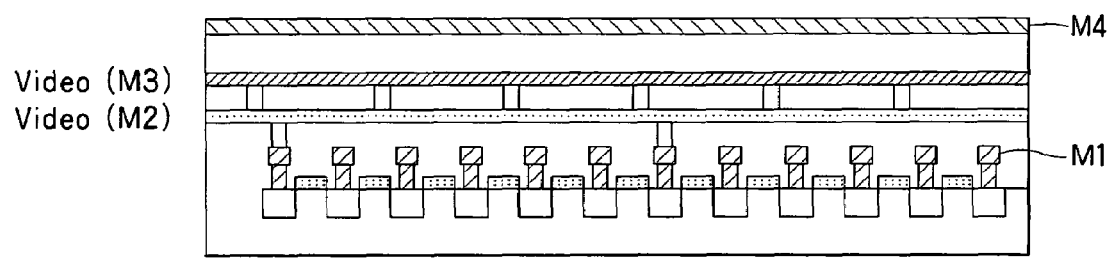
FIG. 16 is a schematic sectional view of the sampling switches shown in FIG. 14.

Disclosed with reference to FIGS. 14 to 16 is a third embodiment of a reflective active matrix liquid crystal display apparatus according to the present invention.

The first and second embodiments according to the present invention enhance signal transfer characteristics for pixel row-scanning electrodes, with the four-layer metal wiring structure, as disclosed above, In contrast, the third embodiment according to the present invention enhances frequency characteristics for a row-signal electrode driver that samples display signals and supplies them to column-signal electrodes, as disclosed below.

FIG. 14 shows a sampling circuit of a row-signal electrode driver used in the third embodiment of a reflective active matrix liquid crystal display apparatus according to the present invention. FIG. 15 is a plan view illustrating wiring patterns for sampling switches of the sampling circuit shown in FIG. 14. FIG. 16 is a schematic sectional view of the sampling switches circuit shown in FIG. 14. A circle CA in FIG. 14 corresponds to a circle CA in FIG. 15.

In FIGS. 14 and 15, wirings for display signals Video1 to Video4 are provided in parallel from an external driver (not shown) per unit of 4 adjacent pixels. The number of parallel display signals depends on the number of pixels in a liquid crystal panel and a drive rate. The wiring for each of the display signals Video1 to Video4 is provided horizontally and connected to (or shared by) the input terminals of CMOS switches for every fourth pixel.

The common wiring for each of the display signals Video1 to Video4 is formed in second and third metal layers M2 and M3. For example, the wirings for the signal Video1 are formed in the second and third layers M2 and M3 and connected to each other with via holes between the layers as shown in FIG. 15, thus parallel in the direction of the stacked layers.

Connection to the input terminals of respective CMOS switches are made by wirings in the direction orthogonal to the horizontal wirings for the display signals Video1 to Video4 disclosed above. Thus, the orthogonal wirings are formed in a first metal layer M1 to avoid crossing with the horizontal wirings as shown in FIG. 16. Also formed in the first metal layer M1 are orthogonal wirings for connection from a horizontal shift register 4a to the gates of the CMOS switches (PMOS and NMOS transistors) to avoid crossing with the horizontal wirings.

The third embodiment employs parallel wirings in two stacked metal layers for each common wiring for the sampling switches of the sampling circuit of the column-signal electrode driver in the four-layer stacked reflective active matrix display apparatus, thus achieving decrease in wiring resistance by about ½.

Moreover, the parallel wirings in two stacked metal layers in the third embodiment achieves far less increase in parasitic capacitance than having wider wirings to lower the wiring resistance, thus enhancing transfer frequency characteristics for the display signals Video1 to Video4.

The uppermost fourth metal layer M4 shown in FIG. 16 has a uniform pattern that covers the entire column-signal electrode driver. A voltage to be applied to the layer M4 with respect to an opposing electrode is used for displaying black. This voltage application achieves light shielding for semiconductor photosensitive sections of the column-signal electrode driver, thus offering stable circuit operation and also black-frame trimming display on the screen for the column-signal electrode driver adjacent to the pixel area.

The parallel wiring structure with several metal layers is not limited to the common wirings for the display signals Video1 to Video4 disclosed above but also applicable to power (Vdd) and/or ground (Vss) potential wirings for the CMOS transistors (PMOS, NMOS) of the sampling switches. Such application decreases wiring resistance of the power and/or ground wirings for the sampling circuit, thus achieving higher-quality image display performance with less noises which could otherwise be caused by fluctuation of reference potential.

As disclosed above in detail, the present invention achieves high-resolution and high-quality display performances for a reflective active matrix liquid crystal display apparatus, with almost no delay in signal transfer along wrings.

What is claimed is:

1. A liquid crystal display apparatus comprising:
    a transparent substrate including a transparent common electrode formed thereon;
    an active matrix substrate including a plurality of display pixels having reflective pixel electrodes, the display pixels being formed in a column direction and a row direction on the active matrix substrate in a matrix fashion, each display pixel including a switching transistor having a gate, a drain and a source, and a signal-charging capacitor;
    a liquid crystal layer provided between the common electrode and the reflective pixel electrode;
    a column-signal electrode driver and a row-scanning electrode driver for activating the active matrix substrate;
    a plurality of column-signal electrodes connected to the column-signal electrode driver, the drain of the switching transistor being connected to each column-signal electrode; and
    a plurality of row-scanning electrodes connected to the row-scanning electrode driver, the gate of the switching transistor being connected to each row-scanning electrode, each reflective pixel electrode being provided at an intersection of each column-signal electrode and each row-scanning electrode, each reflective pixel electrode and the signal-charging capacitor being connected to the source of the switching transistor,
    wherein the active matrix substrate further includes at least a first metal layer, a second metal layer, a third metal layer, and a fourth metal layer formed in order, via interlayer insulating layers between adjacent metal layers, on a wiring layer having the gate of the switching transistor formed therein, the column-signal electrodes and the row-scanning electrodes being formed in the first metal layer and the second metal layer, respectively.

2. The liquid crystal display apparatus according to claim 1, wherein a pattern for electrical connection to the reflective pixel electrode and another pattern for light shielding are formed in the third metal layer.

3. The liquid crystal display apparatus according to claim 2, the second metal layer includes an electrode for electrical connection of the source of the switching transistor to the third and/or fourth layer, the electrode for electrical connection being connected to the pattern for electrical connection, the second metal layer further including a fixed-potential electrode for light shielding, provided between the electrode for electrical connection and each row-scanning electrode.

4. The liquid crystal display apparatus according to claim 1, the reflective pixel electrodes are formed in the fourth metal layer.

* * * * *